United States Patent Office 3,419,415
Patented Dec. 31, 1968

3,419,415
COMPOSITE CARBIDE FLAME SPRAY
MATERIAL
Ferdinand J. Dittrich, Bellmore, N.Y., assignor to
Metco Inc., a corporation of New Jersey
No Drawing. Filed Sept. 29, 1964, Ser. No. 400,203
30 Claims. (Cl. 117—100)

ABSTRACT OF THE DISCLOSURE

A flame spray material such as a powder or wire in the form of a composite containing a refractory carbide and at least 5% by weight based on the molecularly bound carbon in the carbide of excess carbon in a form capable of reacting with the metal of the refractory carbide at flame spray temperatures to form a carbide, the excess carbon preferably being present in amount of about 10–100% by weight based on the molecularly bound carbon. The composite may also be formed of metal capable of forming a refractory carbide and of carbon in a form capable of reacting with this metal to form a carbide. Preferred refractory metals are tungsten, tantalum, zirconium, titanium, molybdenum, chromium, niobium, hafnium, silicon, and boron and the composites are preferably in the form of a powder having the refractory carbide or metal as a core and the excess carbon as a coating. While the excess carbon is preferably in a reactive form of free carbon, the same may also be present in a compound which will decompose at flame spray temperatures to liberate such carbon, as for example, in the form of an organic binder.

---

This invention relates to a novel composite carbide flame spray material. The invention more particularly relates to a composite carbon containing flame spray material, such as a powder or wire, which allows production of pure or crystalline high melting point carbide flame spray coatings without a binder or matrix.

The process of flame spraying involves the melting or heat-softening of a heat-fusible material in the heating zone of a flame spray gun and the propelling of the thus softened or melted particles against the surface to be coated. While it was known to produce flame spray coatings containing high melting point carbides, such as tungsten carbide, tantalum carbide, zirconium carbide, titanium carbide, boron carbide, these carbides were usually bonded in a matrix such as cobalt or nickel, and it was actually the matrix material which was heat-softened in the flame spray process and bonded the carbide in place. The conventional flame spray equipment utilizing a combustion flame, such as an oxy-acetylene flame, generally did not produce high enough temperatures to sufficiently heat-soften the high melting carbide per se for satisfactory spraying.

With the advent of flame spray equipment producing higher temperatures, such as the plasma flame spray guns, it was possible to obtain sufficiently high temperatures to at least theoretically spray the high melting point carbides per se. When, however, attempting to produce coatings of such pure or crystalline carbides without a bonding matrix, satisfactory coatings were not obtained and the same were generally badly oxidized, poorly bonded, and lacked particle coherence. While it was possible to at least partially avoid these difficulties by effecting the spraying in an inert atmosphere, such as an inert gas chamber, spraying in this manner is very difficult, expensive, and generally not practical except in a laboratory. Even when it was possible to spray the hard, high melting point carbides under such specialized conditions, the coatings formed appeared to be of a lower hardness and melting point than the initial carbide.

One object of this invention is a novel flame spray material which allows the production of high melting point, wear-resistant, carbide coatings without the above mentioned difficulties.

A further object of this invention is a novel flame spray material, such as the powder or wire, which allows spraying of high quality, high melting point, carbide coatings without a binder and of a higher hardness and melting point than could previously be obtained.

A further object of this invention is a process for producing high melting, wear-resistant, carbide coatings without a matrix.

These and still further objects will become apparent from the following description:

In accordance with the invention I have discovered that if the refractory carbide is formed as a composite flame spray material containing at least 5%, preferably about 10–100%, and most preferably 20–50% by weight of excess carbon in a form capable of reacting with the metal of the refractory carbide to form a carbide at flame spray temperatures, said percentage values being based on the carbon molecularly bound in the carbide, the same may be flame sprayed without the use of a binder to form high grade coatings.

The starting carbides may be any of the known refractory carbides, such as for example tungsten carbide, tantalum carbide, zirconium carbide, titanium carbide, boron carbide, columbium carbide, hafnium carbide, molybdenum carbide, silicon carbide, vanadium carbide, beryllium carbide, cobalt carbide, iron carbide, lanthanum carbide, manganese carbide, scandium carbide, thorium carbide, uranium carbide, chromium carbide, or mixtures or solid solutions thereof, as for example solid solution carbides of tantalum, hafnium, and zirconium, as set forth in my co-pending application, Ser. No. 391,300, filed Aug. 21, 1964.

The starting carbides are preferably of a stoichiometric composition, as for example WC, TaC, ZrC, TiC, $B_4C$, $Cr_2C_3$, NbC, HfC, $Mo_2C$, SiC, VC, $Be_2C$, $Co_2C$, $Fe_3C$, $LaC_2$, $Sc_4C_3$, $ThC_2$, $U_2C_3$. These starting carbides, however, need not have the stoichiometric composition as for example set forth above, and for special properties, such as greater ductility, hardness, etc., the ratio of carbon to the metal in the carbide may vary from the stoichiometric ratio. Thus, for example, a eutectic mixture of WC and $W_2C$ may be used.

It is also possible to use carbides which contain less carbon than is desired in the ultimate coating, and to make up this carbon deficiency with an additional quantity of carbon in the composite. In this case the composite should have a sufficient amount of carbon to combine with the carbide, converting the same to a carbide of the higher desired carbon content, and should preferably have the excess mentioned over this amount. The starting carbide may, of course, have any carbon content and in the limiting case may be a metal, as is explained hereinafter.

The starting carbides are to be distinguished from metal bonded carbides containing a matrix metal binder, as for example a 12% cobalt bonded tungsten carbide, and it is conventional in the art for this purpose to refer to the carbide as "pure" or "crystalline," these terms being used only to distinguish from the matrix containing metal bonded carbides and not to designate any actual state of purity or crystallinity.

The starting carbide is formed into a composite containing about 10–100% by weight of free carbon, based on the carbon molecularly bonded in the carbide. The composite may basically take two forms, i.e., as a powder for spraying in a powder type gun or as a wire (the term "wire" generically designating wires, rods and the like) for use in a wire-type flame spray gun.

In connection with composite powders, each of the powder particles may contain the refractory metal carbide and the excess free carbon.

The carbon is, for example, in the form of ordinary lamp black, graphite, low ash coke, "sugar carbon," carbon black, charcoal, etc., which may be combined into an aggregate with the refractory metal carbide, as for example by briquetting with a binder, if necessary or desired, as for example chlorinated rubber, polyesters, or polyolefins, such as polyethylene, vinyls, cellulose plastics, and preferably a catalyzed resin such as a phenolic or epoxy resin, and grinding and/or screening to the desired particle size.

Preferably the composites are formed by cladding or coating particles of the refractory metal carbide with the required amount of carbon, or even conversely coating the carbide on a carbon core.

The coating may be effected in any known or conventional manner, as for example by vapor deposition, by known chemical processes, by oxidation reactions leaving a carbon coating or the like.

A preferred and greatly simplified mode of forming the clad powders in accordance with the invention involves the depositing of the coating layer in the form of a paint on the core. Thus, for example, finely divided carbon, such as graphite, lamp black or the like, may be dispersed in a binder or lacquer so that, in effect, a paint is formed in which the carbon corresponds to the pigment. The paint is then used to coat the core particles of the refractory metal carbide and the binder or lacquer allowed to set or dry. The binder material may be an air drying type or alternatively a resin which does not depend on solvent evaporation in order to form a dry film or set as a film, and which film will decompose or break down in the heat of the spraying process. The binder, for example, may be a phenolic varnish or any other conventional varnish, preferably containing a resin as the varnish solids. The component which is initially mixed with the binder or varnish, as for example the carbon, should preferably be finely divided, for instance −325 mesh and preferably about 1–20 microns. The other component, which is the refractory metal carbide which constitutes the core, should be approximately or only slightly below the particle size ultimately desired for the spray powder. The coating of the core component with the "paint" may be effected in any known or desired manner, and it is simply necessary to mix the two materials together and allow the binder to set or dry, preferably while mixing or tumbling with the application of heat, which will result in a fairly free-flowing powder consisting of the core component coated with a cladding of the other component, such as the carbon found in the binder.

The binder is preferably an organic material which, under the conditions involved in the flame spraying, will oxidize or decompose, leaving a carbon residue and at least a portion of the required carbon excess may be supplied in this form, i.e., molecularly bound as an organic compound, as for example in the binder. Examples of binders which may be used in conjunction with the refractory carbide particles to bind the carbon and/or supply additional carbon include: phenolic and epoxy resin varnishes of the catalyzed type or of the solvent evaporation type, chlorinated rubber binders and cellulose varnishes.

The end powder particles should have a size between 80 mesh U.S. Standard screen size and 5 microns, and preferably 170 mesh U.S. Standard screen size and 15 microns, and should contain 10–100%, preferably 20–50%, by weight of excess carbon over and above the carbon molecularly bound in the carbide. As mentioned, at least a portion of this excess carbon may be in the form of organic compound, such as the binder.

In order to produce flame spray wires, the composite powders as described above may be bonded into wire form, using plastic binders, for example polyolefins, such as polyethylene or the like; or the powder may be packed into a plastic sheath, as for example a polyethylene sheath.

Alternatively, wires may be formed from a metal sheath corresponding to the metal of the refractory carbide, and this sheath filled with the carbon and the metal carbide. In this embodiment further sufficient excess of carbon should preferably be provided in order to form a carbide with the metal sheath.

In accordance with a further embodiment of the invention the composites are formed from the metal per se and an amount of carbon necessary to form the desired refractory carbide with the metal, and preferably an amount of carbon of 5–100% by weight in excess of this amount. The composites are formed in the same manner as described above except that the metal is used in place of the carbide, and an additional amount of carbon is utilized corresponding to the amount required to form the desired carbide with the metal.

In connection with wires the composite may be formed, for example, with a sheath of the metal capable of forming the refractory carbide and a core of the carbon or a mixture of carbon and the metal.

In accordance with the still further embodiment of the invention, in place of the metal per se, a compound of the metal, such as an oxide, an agglomerated mixture of two or more oxides, a co-precipitated metal oxide, or a hydride, may be used. In this case the amount of carbon should be sufficient to react with the compound so as to reduce the oxide and carburize the resultant metal. Preferably at least a 5% excess of carbon, based on the carbon in the ultimate carbide, should be used.

In the case where the oxides are in the form of an agglomerated mixture of oxides or co-precipitated oxides, or the hydrides are in the form of metal alloy hydrides, solid solution carbides may be formed. In connection with wires the composites may be formed, for example, with a sheath of the metal capable of forming the refractory oxide and a core of the carbon and a mixture of carbon and the metal compound.

Composites may also be formed containing the metal and/or the metal compound, the refractory metal carbide and the carbon. There should preferably be sufficient carbon to form the refractory carbide with the metal or metal compound plus an excess of 10–100% of carbon, based on the carbon in the carbide and the carbon for reaction with the refractory metal to form the carbide.

Where the metal and carbon will exothermically react, forming the carbide, improved results are obtained, in that hard, dense coatings may be formed.

The spraying is effected in the conventional manner, using conventional flame spray equipment which is capable of generating sufficient heat for the heat-softening of the particular carbide in question. It is generally preferable to effect the spraying with a plasma type flame spray gun, as such equipment is in all instances capable of producing sufficiently high temperatures.

A combustion flame spray gun may, for example, be used for the carbon clad metal, oxide or hydride composites, when the "ignition" temperature is not too high, even if the carbide formed has a very high melting point.

The composites may be sprayed per se or in combination with any other conventional flame spray material. Thus, for example, mixtures of the composite powders may be sprayed with ordinary metal powders and preferably self-fluxing alloy sprayweld powders, such as nickel base alloys containing boron and silicon as a fluxing element. It is particularly desirable to use mixtures of the self-fluxing alloy sprayweld powders with composites containing a metal which will exothermically react with the carbon forming the carbide, as in this case at least partially fused coatings will be directly formed upon spraying, and a subsequent fusing operation may not be required.

The spraying may be used in any application where it is desirable to obtain carbide coatings with their high degree of hardness and high melting point. Coatings produced with the composites in accordance with the invention are well bonded, have good particle coherence, and are useful for high temperature and wear-resistant applications. The composites may be sprayed on any surfaces which can be normally coated by flame-spraying, as for example mild steel, stainles steel, nickel base alloys, cobalt base alloys, titanium, columbium, tantalum, aluminum, copper, copper alloys, graphite etc.

Coatings may be used in any applications where it is desired to produce wear-resistant, abrasion-resistant or heat-resistant coatings, or coatings which will stand up in a neutral or reducing atmosphere or under vacuum. The coatings may be used, for example, for rocket nozzle throats, bearing journals, pump plungers, tractor treads, plow shares, piston rings, valve seats, knife edges and the like.

The following examples are given by way of illustration and not limitation:

EXAMPLE 1

80 grams of an air-drying oil-modified, phenolic varnish containing about 10% solids and 90% alcohol and aromatic hydrocarbons (Metco Seal AP), 85 grams graphite (Dixon 1110), and 45 grams of varnish thinner containing equal parts of ketone and aromatic hydrocarbons with small quantities of alcohol and ester-type solvents, were blended to produce a cladding mixture containing approximately 93 grams of solid and approximately 117 grams of vehicle and thinners.

Of the 93 grams of solids about 89 grams was carbon (85 g. graphite and approximately 4 g. C from phenolic resin).

A solid solution of tantalum carbide plus (zirconium plus hafnium) carbide (4TaCl(Zr and Hf)C) having a particle size between −230 mesh and 10 microns was coated by mixing 100 grams of the carbide powder and 10 grams of the wet mixture containing graphite. As the cladding mixture was added to the powder, it was totally contained in the powder without any excess liquid, and did not penetrate through the entire bulk of the carbide powder. The mixture had to be tumbled in order to coat all of the particles. After approximately five minutes of tumbling, it appeared that all of the particles were coated with the cladding, and at this point the material was not to free-flowing. The clad material was then warmed to evaporate the last of the solvents, agitating the mixture as drying progressed. After complete drying of the powder it was free-flowing and each of the particles was coated with the carbon mixture. Metallographic examination showed carbide core particles on which there was a fairly even coating of the cladding material, which had also penetrated the pores in the carbide particles.

This clad powder was sprayed with a Metco type 2MB plasma flame spray gun, using B nozzle and Metco type 2MP powder hopper onto cold rolled steel coupons prepared by surface grinding, forming a coating .007" thick. A nitrogen-hydrogen plasma gas mixture was used, and nitrogen was used to convey the powder. Plasma nitrogen flow was 100 s.c.f.h. at 50 p.s.i., plasma hydrogen flow was 25 s.c.f.h. at 50 p.s.i., and powder carrier nitrogen flow was 10 s.c.f.h. at 50 p.s.i. Electric current was 400 amperes at 72 volts. Spray distance was 4 inches.

The sprayed material was completely self-bonding and the coating formed was extremely hard and dense, particle cohesion was excellent, and grind finish with diamond wheels was very good. The coating was impervious to the standard potassium ferricyanide porosity test.

The original carbide, by chemical analysis, contained 7.0 weight percent total carbon, of which 6.75 weight percent was combined carbon and the remainder was free carbon.

When the powder clad with about 4.3 weight percent of carbon, as described above, was sprayed under the conditions described above, the carbon content of the coating was 6.90 weight percent, which was 98.6% of the original total carbon and 102.2% of the original combined carbon.

EXAMPLE 2

Example 1 is repeated, cladding the following carbides with the cladding mixture of Example 1:

Boron carbide ($B_4C$); chromium carbide ($Cr_2C_3$); columbium carbide (NbC); hafnium carbide (HfC); molybdenum carbide ($Mo_2C$); silicon carbide (SiC); tantalum carbide (TaC); titanium carbide (TiC); tungsten carbide (WC); vanadium carbide (VC); zirconium carbide (ZrC); beryllium carbide ($Be_2C$); cobalt carbide ($Co_2C$); iron carbide ($Fe_3C$); lanthanum carbide ($LaC_2$); scandium carbide ($Sc_4C_3$); thorium carbides ($ThC_2$ and ThC); and uranium carbide ($U_2C_3$). In each case a clad composite powder of a particle size between 170 mesh U.S. Standard screen size and 15 microns was formed, which could be flame-sprayed with a plasma flame as described in Example 1 to produce a dense, hard, refractory carbide coating.

EXAMPLE 3

Carbon was clad by vapor deposition onto tantalum metal powder so that the total carbon in the starting powder was 6.1 weight percent. The composite powder was plasma flame sprayed with a nitrogen hydrogen plasma, as described in Example 1, and the resultant powder collected in water. The powder was dried and analyzed for total carbon content, which was determined to be 3.63 weight percent carbon. After carbon analysis, an additional sample of the same material was analyzed for constituents in an X-ray diffraction study. A study of the lines indicated tantalum carbide as the principal component, tantalum nitride present in a minor amount, and tantalum metal present in a smaller amount. Since stoichiometric $Ta_2C$ contains 3.21% of carbon and TaC contains 6.23% of carbon, it is obvious from the above analysis that the deposited powder probably contains some proportion of TaC, some $Ta_2C$, a minor proportion of tantalum nitride, and a lesser amount of tantalum metal.

It is possible to deposit a stoichiometric tantalum carbide by spraying a composite powder containing the correct weight percentage of carbon. When the powder is sprayed on a ground steel surface, a dense, hard tantalum carbide coating is formed.

EXAMPLE 4

Example 2 may be repeated, starting however with the corresponding refractory metals rather than the carbides, and in each case effecting the cladding with an additional amount of the cladding mixture corresponding to the stoichiometric amount of carbon in the carbide of a particular refractory metal. In each case a coated composite is formed which may be flame-sprayed as described in Example 1 in order to produce a carbide coating.

EXAMPLE 5

Crystalline tungsten carbide was clad with approximately 2 weight percent of solids resulting from the evaporation of solvents from a phenolic varnish. The phenolic was chosen in this particular instance because, upon decomposition of the resin by heating, carbon is the residual product. Actually, any material which upon decomposition leaves a carbon residual, may be used.

EXAMPLE 6

The powders of Examples 1 and 2 are each mixed with molten polyethylene and extruded in the form of wires to produce flame spray wires of ⅛" diameter, which may be flame-sprayed to form the refractory carbide coating.

EXAMPLE 7

Tantalum is drawn in the form of a hollow tube of ½" diameter. The interior of the tube is packed with a mixture of carbon and tantalum powder so that the total amount of carbon based on the tantalum, including the powder and the sheath, is about 8% by weight. The tube is drawn or swaged to ⅛" diameter. The composite wire thus formed may be used for flame spraying in order to produce a tantalum carbide coating.

While the invention has been described with reference to certain specific embodiments, various changes and modifications which fall within the spirit of the invention will become apparent to the skilled artisan. The invention is therefore only intended to be limited by the appended claims or their equivalents wherein I have endeavored to claim all inherent novelty.

I claim:

1. A flame spray material comprising a composite of a refractory carbide and excess carbon in a form capable of reacting with the metal of the refractory carbide to form a carbide, said excess carbon being present in amount of at least 5% by weight based on the molecularly bound carbon in carbide.

2. A flame spray material according to claim 1 in which said excess carbon is present in amount of about 10–100% by weight based on the molecularly bound carbon in said carbide.

3. A flame spray material according to claim 1 in which said refractory carbide is at least one member selected from the group consisting of crystalline tungsten carbide, tantalum carbide, zirconium carbide, titanium carbide, and boron carbide.

4. A flame spray material according to claim 1 in which at least a portion of said excess carbon is present in the form of an organic binder.

5. A flame spray material according to claim 1 in the form of a wire.

6. A flame spray material comprising a composite of a metal selected from the group consisting of tungsten, tantalum, zirconium, titanium, molybdenum, chromium, niobium, hafnium, silicon, and boron, and carbon in a form capable of reacting with said metal to form a refractory carbide.

7. A flame spray material according to claim 6 in which said carbon is present in amount of about 5–100% by weight in excess of the stoichiometric quantity for the formation of said refractory carbide.

8. A flame spray material according to claim 6 in which at least a portion of said carbon is in the form of an organic binder.

9. A flame spray material according to claim 6 in the form of a wire.

10. A flame spray powder comprising particles having a core and at least one coating layer, one of said core and coating layer comprising a refractory carbide, the other carbon, said carbon being present in amount of at least 5% by weight based on the carbon in said carbide.

11. A flame spray powder comprising particles of a refractory carbide coated with about 5–100% by weight of carbon based on the carbon in said carbide.

12. A flame spray powder according to claim 11 in which said carbon is present in amount of about 20–50% by weight based on the carbon in said carbide.

13. A flame spray powder according to claim 11 in which said carbon is present as a coating layer in an organic binder.

14. A flame spray powder according to claim 13 in which at least a portion of the carbon is in the form of said organic binder.

15. A flame spray powder according to claim 11 in which said refractory carbide is at least one member selected from the group consisting of tungsten carbide, tantalum carbide, zirconium carbide, titanium carbide, and boron carbide.

16. A flame spray powder comprising particles having a core and at least one coating layer, one of said core and coating layer comprising a metal selected from the group consisting of tungsten, tantalum, zirconium, titanium, molybdenum, chromium, niobium, hafnium, silicon, and boron, capable of forming a refractory carbide, the other of said core and coating layer comprising carbon for forming a refractory carbide with said refractory metal.

17. A flame spray powder according to claim 16 in which said carbon is present in amount of about 5–100% by weight in excess of the stoichiometric quantity for the formation of said carbide.

18. A flame spray powder comprising particles of a metal capable of forming a refractory carbide coated with a coating layer of carbon for forming a carbide with said refractory metal.

19. A flame spray powder according to claim 18 in which said carbon is present in amount of about 5–100% by weight in excess of the stoichiometric quantity for the formation of said carbide.

20. A flame spray powder according to claim 19 in which said carbon is present in an organic binder.

21. A flame spray powder according to claim 20 in which at least a portion of said carbon is present in the form of said organic binder.

22. A flame spray powder comprising a core and at least one coating layer, one of said core and said coating layer being carbon in a form capable of reacting with a metal to form a refractory carbide, the other being a metal capable of exothermically reacting with the carbon at flame spray temperatures, forming a refractory carbide.

23. A flame spray material comprising a composite of a compound of a metal capable of reacting with carbon to form a refractory carbide, and carbon for reacting with said compound to form a refractory carbide at least a portion of said carbon being in the form of free carbon.

24. A flame spray material according to claim 23 in which said compound is a member selected from the group consisting of oxides and hydrides of a metal capable of forming a refractory carbide.

25. A flame spray material according to claim 24 in which said metal is a member selected from the group consisting of tungsten, tantalum, zirconium, titanium, and boron.

26. A flame spray material according to claim 25 in the form of a powder comprising particles having a core of said compound and a coating layer of carbon.

27. A flame spray powder according to claim 26 in which said carbon is present in amount of at least 5% by weight in excess of the amount required to form the carbide.

28. In a flame spray process in which a heat-fusible material is being heated to at least heat-softening temperature and sprayed against the surface to be coated, the improvement for forming a refractory carbide coating which comprises effecting said spraying with a flame spray material comprising a composite of a refractory carbide and excess carbon in a form capable of reacting with the metal of the refractory carbide to form a carbide, said excess carbon being present in amount of at least 5% by weight based on the molecularly bound carbon in said carbide.

29. In a flame spray process in which a heat-fusible material is heated to at least heat-softening temperature and sprayed against the surface to be coated, the improvement for forming a refractory carbide coating which comprises effecting said spraying with a composite of a metal capable of forming a refractory carbide selected from the group consisting of tungsten, tatalum, zirconium, titanium, molybdenum, chromium, niobium, hafnium, silicon, and boron, and carbon in a form capable of reacting with said metal to form a carbide.

30. In a flame spray process in which a heat-fusible material is heated to at least heat-softening temperature and sprayed against a surface to be coated, the improvement for forming a refractory carbide coating which comprises effecting said spraying with a composite of carbon and a compound of a metal capable of reacting with carbon to form a refractory carbide, said carbon being in a form capable of reacting with said metal compound to form a carbide, at least a portion of said carbon being present as free carbon.

References Cited
UNITED STATES PATENTS

| | | | |
|---|---|---|---|
| 2,997,413 | 8/1961 | Wagner | 117—105.2 X |
| 3,254,970 | 7/1966 | Dittrich et al. | |
| 3,288,623 | 11/1966 | Colton | 117—105.2 X |
| 3,322,546 | 5/1967 | Tanzman et al. | 117—105.2 X |

RALPH S. KENDALL, *Primary Examiner.*

J. H. NEWSOME, *Assistant Examiner.*

US. Cl. X.R.

29—192; 106—43, 56; 117—46, 93.1, 105.2

UNITED STATES PATENT OFFICE
CERTIFICATE OF CORRECTION

Patent No. 3,419,415                                                December 31, 196

Ferdinand J. Dittrich

It is certified that error appears in the above identified patent and that said Letters Patent are hereby corrected as shown below:

Column 5, line 38, "(4 TaCl(Zr and Hf) C)" should read -- (4 TaC. 1 (Zr and Hf) C) --.

Signed and sealed this 17th day of March 1970.

(SEAL)
Attest:

Edward M. Fletcher, Jr.                    WILLIAM E. SCHUYLER, JR.
Attesting Officer                                  Commissioner of Patents